(12) United States Patent
Huang

(10) Patent No.: US 10,733,421 B2
(45) Date of Patent: Aug. 4, 2020

(54) METHOD FOR PROCESSING VIDEO, ELECTRONIC DEVICE AND STORAGE MEDIUM

(71) Applicant: BEIJING KINGSOFT INTERNET SECURITY SOFTWARE CO., LTD., Beijing (CN)

(72) Inventor: Chiachi Huang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 167 days.

(21) Appl. No.: 15/913,314

(22) Filed: Mar. 6, 2018

(65) Prior Publication Data
US 2019/0005305 A1 Jan. 3, 2019

(30) Foreign Application Priority Data

Jun. 30, 2017 (CN) .......................... 2017 1 0531790

(51) Int. Cl.
*G06K 9/00* (2006.01)
*G06T 7/11* (2017.01)
*G06T 11/00* (2006.01)

(52) U.S. Cl.
CPC ..... *G06K 9/00248* (2013.01); *G06K 9/00281* (2013.01); *G06K 9/00711* (2013.01); *G06T 7/11* (2017.01); *G06T 11/00* (2013.01); *G06T 2207/30201* (2013.01)

(58) Field of Classification Search
CPC ........... G06K 9/00248; G06K 9/00281; G06K 9/00711; G06K 9/00268; G06T 11/00; G06T 7/11; G06T 2207/30201
See application file for complete search history.

(56) References Cited

U.S. PATENT DOCUMENTS 6,283,858 B1 * 9/2001 Hayes, Jr. .......... G06K 9/00268
345/418
7,068,835 B1 * 6/2006 Ban ........................ G06K 9/522
382/154
(Continued)

FOREIGN PATENT DOCUMENTS

CN 105118023 12/2015

OTHER PUBLICATIONS

SIPO, First Office Action for CN Application No. 201710531790.X, dated Mar. 26, 2020.

*Primary Examiner* — Xuemei G Chen
(74) *Attorney, Agent, or Firm* — Hodgson Russ LLP

(57) ABSTRACT

Embodiments of the present disclosure provide a method and a device for processing a video, an electronic device and a storage medium. The method includes: performing target recognition on each frame in an input video to obtain M frames containing a first face image, in which M is an integer greater than 1; replacing the first face image in the M frames with a target face image to obtain M first output frames; performing feature point locating on the first face image in a first frame in the M frames to obtain a first feature point set; extracting a target feature point set corresponding to a target region from the first feature point set; and performing image synthesis according to the target feature point set and the M first output frames to obtain M second output frames.

14 Claims, 6 Drawing Sheets

(56) References Cited

U.S. PATENT DOCUMENTS

| | | | | |
|---|---|---|---|---|
| 7,885,477 B2* | 2/2011 | Ito | | G06K 9/00275 |
| | | | | 382/254 |
| 7,925,060 B2* | 4/2011 | Norita | | G06K 9/00288 |
| | | | | 382/115 |
| 8,270,764 B1* | 9/2012 | Agarwala | | G06T 11/60 |
| | | | | 345/629 |
| 8,472,722 B2* | 6/2013 | Nayar | | G06T 11/60 |
| | | | | 382/190 |
| 8,570,403 B2* | 10/2013 | Lee | | H04N 5/272 |
| | | | | 348/239 |
| 8,648,924 B2* | 2/2014 | Akifusa | | H04N 1/00183 |
| | | | | 348/218.1 |
| 8,831,379 B2* | 9/2014 | Wen | | G06K 9/00228 |
| | | | | 345/629 |
| 9,195,881 B2* | 11/2015 | Kim | | G06T 3/0006 |
| 9,336,583 B2* | 5/2016 | Huang | | G06T 5/50 |
| 9,478,056 B2* | 10/2016 | James | | G06F 16/51 |
| 9,569,699 B2* | 2/2017 | Wang | | G06T 11/60 |
| 9,639,738 B2* | 5/2017 | Hsieh | | G06T 11/00 |
| 9,799,096 B1* | 10/2017 | De la Torre | | G06T 3/0093 |
| 9,898,835 B2* | 2/2018 | Hsieh | | G06T 11/00 |
| 9,971,933 B1* | 5/2018 | Shen | | G06K 9/00288 |
| 10,283,162 B2* | 5/2019 | Shaburova | | G06T 5/005 |
| 2002/0176627 A1* | 11/2002 | Monden | | G06K 9/00087 |
| | | | | 382/219 |
| 2004/0056007 A1* | 3/2004 | Troitski | | H04N 1/387 |
| | | | | 219/121.69 |
| 2006/0159370 A1* | 7/2006 | Tanaka | | G06K 9/4652 |
| | | | | 382/305 |
| 2007/0237421 A1* | 10/2007 | Luo | | G06T 11/60 |
| | | | | 382/284 |
| 2009/0304239 A1* | 12/2009 | Itou | | G06K 9/00255 |
| | | | | 382/118 |
| 2010/0079491 A1* | 4/2010 | Nonaka | | G06T 11/00 |
| | | | | 345/630 |
| 2010/0209069 A1* | 8/2010 | Fountaine | | G11B 27/034 |
| | | | | 386/278 |
| 2011/0298799 A1* | 12/2011 | Mariani | | G06K 9/00221 |
| | | | | 345/420 |
| 2012/0005595 A1* | 1/2012 | Gavade | | G11B 27/034 |
| | | | | 715/751 |
| 2013/0050395 A1* | 2/2013 | Paoletti | | H04N 7/142 |
| | | | | 348/14.02 |
| 2013/0242127 A1* | 9/2013 | Kasahara | | H04N 5/272 |
| | | | | 348/222.1 |
| 2014/0112534 A1* | 4/2014 | Sako | | G06F 21/6245 |
| | | | | 382/103 |
| 2014/0153832 A1* | 6/2014 | Kwatra | | G06T 11/00 |
| | | | | 382/195 |
| 2014/0321703 A1* | 10/2014 | Inomata | | G06K 9/00624 |
| | | | | 382/103 |
| 2017/0178306 A1* | 6/2017 | Le Clerc | | G06T 7/11 |
| 2017/0371231 A1* | 12/2017 | Shintani | | H04N 19/513 |
| 2018/0144212 A1* | 5/2018 | Burgos | | G06K 9/00275 |
| 2018/0300864 A1* | 10/2018 | Baba | | G06K 9/3241 |
| 2019/0005632 A1* | 1/2019 | Huang | | G06T 5/005 |
| 2019/0279347 A1* | 9/2019 | Hayasaka | | G06K 9/00281 |
| 2019/0384966 A1* | 12/2019 | Kim | | G06T 7/62 |
| 2020/0057910 A1* | 2/2020 | Aoki | | G06K 9/6202 |

* cited by examiner

METHOD FOR PROCESSING VIDEO, ELECTRONIC DEVICE AND STORAGE MEDIUM

CROSS-REFERENCE TO RELATED APPLICATIONS

This application claims priority to and benefits of Chinese Patent Application Serial No. 201710531790.X, filed with the State Intellectual Property Office of P. R. China on Jun. 30, 2017, the entire content of which is incorporated herein by reference.

FIELD

The present disclosure relates to a digital video processing technology field, and more particularly to a method for processing a video, a device for processing a video, an electronic device and a storage medium.

BACKGROUND

Face-swap gradually becomes a social and entertainment hotspot with developments of network and computer technology. Various applications having face-swap have been developed, which brings fun to life of people.

In the related art, face-swap is generally realized by recognizing a face region in an original image, obtaining the face region, putting the face region into a target image, and performing face fusion or naturalization to make the target image natural. However, for the face-swap in a video, the video is split into a sequence of frames, and the face-swap is performed on the frames one by one, and after that, the frames performed with the face-swap are synthesized to from a new video, thus operations lack of convenience.

SUMMARY

According to a first aspect of embodiments of the present disclosure, a method for processing a video is provided, which includes: performing target recognition on each frame in an input video to obtain M frames containing a first face image, in which M is an integer greater than 1; replacing the first face image in the M frames with a target face image to obtain M first output frames; performing feature point locating on the first face image in a first frame in the M frames to obtain a first feature point set; extracting a target feature point set corresponding to a target region from the first feature point set; and performing image synthesis according to the target feature point set and the M first output frames to obtain M second output frames.

According to a second aspect of embodiments of the present disclosure, an electronic device is provided, which includes: a housing, a processor, a memory, a circuit board and a power circuit, in which, the circuit board is arranged inside a space enclosed by the housing, the processor and the memory are disposed on the circuit board; the power circuit is configured to provide power for individual circuits or components of the electronic device; the memory is configured to store executable program codes; and the processor, by reading the executable program codes stored in the memory, is configured to run programs corresponding to the executable program codes, so as to perform the method for processing a video provided in the first aspect of embodiments of the present disclosure.

According to a third aspect of embodiments of the present disclosure, a non-transitory computer-readable storage medium is provided, having stored therein instructions that, when a processor executes the instructions, cause the processor to perform the method for processing a video provided in the first aspect of embodiments of the present disclosure.

According to a fourth aspect of embodiments of the present disclosure, an application is provided, when executed, configured to perform the method for processing a video provided in the first aspect of embodiments of the present disclosure.

BRIEF DESCRIPTION OF THE DRAWINGS

In order to explicitly illustrate technical solutions in embodiments of the present disclosure, a brief introduction for the accompanying drawings used when describing the embodiments will be listed as follows. Apparently, the drawings described below are only corresponding to some embodiments of the present disclosure, and those skilled in the art may obtain other drawings according to these drawings without creative labor.

DETAILED DESCRIPTION

In the following, technical solutions in embodiments of the present disclosure will be described clearly and completely with reference to drawings in the embodiments. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

The terms in descriptions, claims and drawings such as "first," "second", "third" and the like are used to distinguish different objects, and are not used to describe a particular order. In addition, terms such as "comprising", "containing" and any modifications of them are intended to cover non-exclusive inclusion. For example, it includes a series of process, methods, systems, products, or devices of steps or modules, and is not limited to the listed steps or modules, alternatively, it also includes steps or modules that are not listed, and alternatively, it also includes other steps or modules inherent to the process, methods, products or devices.

"An embodiment" mentioned herein means that, a particular feature, structure, or characteristic described in combination with the embodiment may be included in at least one embodiment of the present disclosure. The appearances of the embodiment appearing in various positions of the description do not necessarily refer to a same embodiment, and are not separate or alternative embodiments that are exclusive with each other. As those skilled in the art explicitly and implicitly appreciate, the embodiments described herein may be combined with other embodiments.

An electronic device mentioned in embodiments of the present disclosure may include such as a smart phone (such as an Android phone), a tablet computer, a handheld computer, a notebook computer, a mobile internet device (MID), or a wearable device. The devices are only exemplary rather than exhaustion, including but being not limited to these electronic devices.

Embodiments of the present disclosure provide a method for processing a video, a device for processing a video, an electronic device and a storage medium, so as to solve a technical problem of lacking convenience caused by performing face-swap on each frame and then performing video synthesis during face-swap of video, and will be described in detail respectively in the following.

Figure 1:
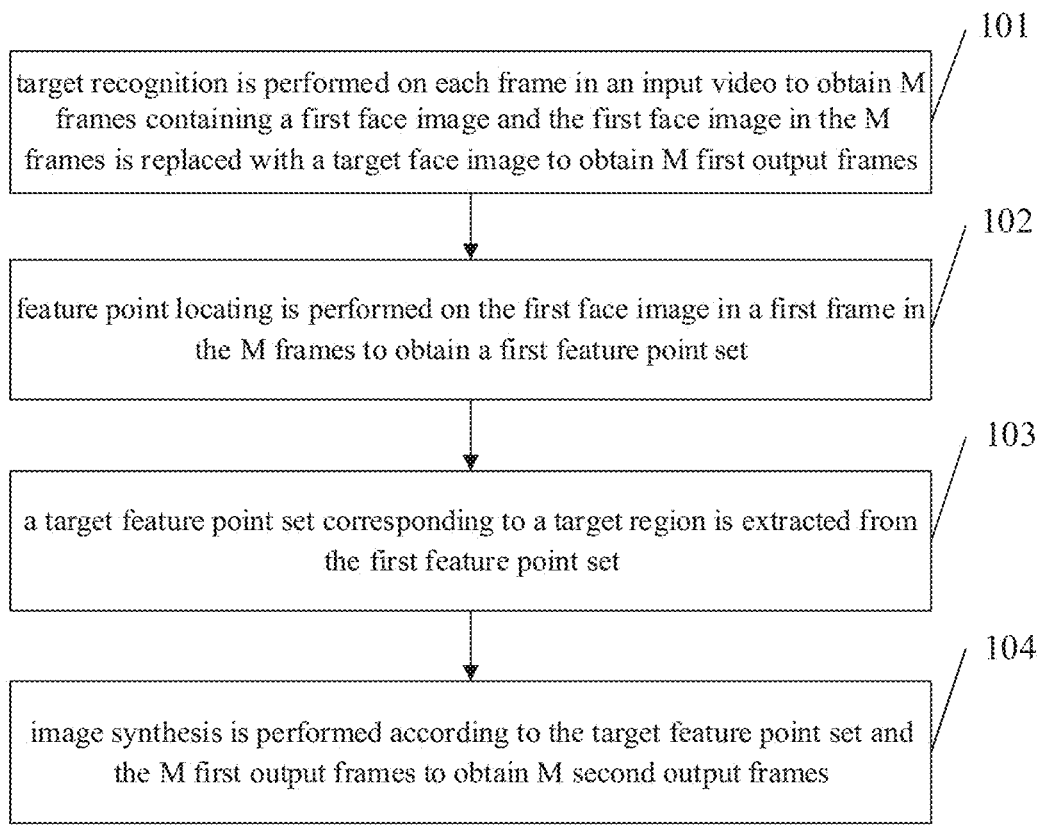
FIG. 1 is a flow chart of a method for processing a video according to embodiments of the present disclosure.

FIG. 1 is a flow chart of a method for processing a video according to embodiments of the present disclosure. Referring to FIG. 1, the method for processing a video may include following acts.

At block 101, target recognition is performed on each frame in an input video to obtain M frames containing a first face image and the first face image in the M frames is replaced with a target face image to obtain M first output frames.

In this embodiment, M is an integer greater than 1. In embodiments of the present disclosure, based on a face-swap scene, the target recognition is performed on each frame in the input video, and only frames containing the first face image are extracted, thus improving extraction efficiency.

In this embodiment, ffmpeg (Fast Forward Mpeg (Moving Picture Experts Group)) technology may be selected to split the input video into frames, and complexity for processing the whole input video may be reduced, thus improving a speed for processing the video. Technologies for splitting video segments are not limited herein.

In this embodiment, feature extracting algorithms such as HOG (Histogram of Oriented Gradient), LBP (Local Binary Pattern), Gabor wavelet, Haar-like may be used to extract face features, which is not limited herein. When there are a plurality of target faces, processing may be performed specific to the plurality of target faces respectively according to the method according to embodiments of the present disclosure.

After face information in a frame is recognized, a frame matching with the target face is selected according to the recognized face information. Since the frame may contain a plurality of faces, when the first face image is recognized, identification of identity information is performed on the first face image. In addition to feature information of the first face image, the identity information may also include a time point when the first face image appears in the input video.

Alternatively, face features of each frame are extracted, and integration processing is performed on the frame according to the face features to obtain an integration image. Enhanced classifiers for classifying faces or non-faces in the integration image based on adaptive enhancement algorithm are adopted. The enhanced classifiers for classifying faces are connected in series through a waterfall typed cascading classifier, so as to obtain a face image. It is judged whether the face image is the first face image. If the face image is the first face image, it is determined that the video segments contain the target face. With this method, different features are calculated in various scales with the same time, such that a large amount of regions to be detected may be eliminated rapidly, reducing average detection cost, thus improve efficiency of the face recognition.

It should be noted that, in addition to a video, the input video may also be a dynamic image composed by a plurality of continuous frames, or an image file formed by continuously photographing. The input video may be uploaded to a server end, or may be loaded to a local end, or may be updated to the server end from the local end. Since the server end uses a large amount of labels to identify objects, scenes, and character's expressions in the input video, when the input video is uploaded to the server end, it is helpful to improve the accuracy for identifying the face information.

Figure 2:
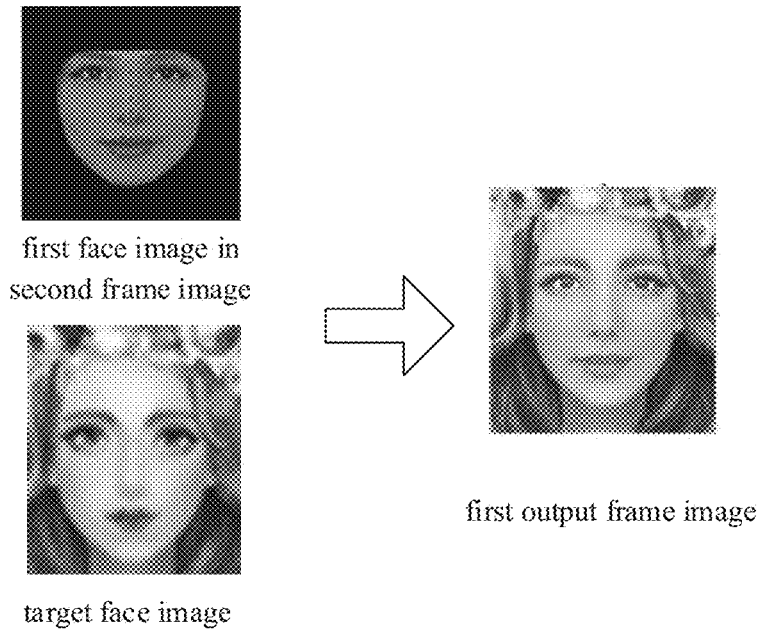
FIG. 2 is a schematic diagram illustrating a face-swap according to embodiments of the present disclosure.

In this embodiment, the first face image in each of the M frames is replaced to the target face image. That is, the face features of the each of the M frames are replaced with the face features of the target face image. As illustrated in FIG. 2, the target face image is an image designated by a user, and the first face image is replaced to the target face image.

Alternatively, pre-processing is performed on the target face image to obtain a target frame, and the first face image in the M frames is replaced with the target frame to obtain the M first output frames.

The pre-processing may be face alignment processing, image enhancement processing and normalization processing, and the like. By performing the face alignment processing on the target face image, a face image with a regular face position may be obtained. By performing inverse alignment processing on a converted target face image, a face image with a face position coincident with that of the target face image, thus enhancing image effect. Image enhancement is to improve face image quality, that is, not only to make the image more clarity visually, but also to make the image easier for a computer to process and identify. A target of the normalization processing is to obtain normalized face images with a same size and a same range of gray value, thus further improving the image effect.

Figure 3:
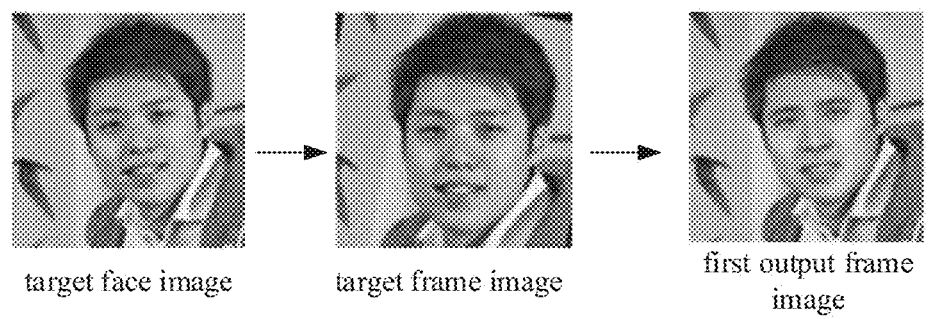
FIG. 3 is a schematic diagram illustrating a face-swap method according to embodiments of the present disclosure.

For example, as the schematic diagram of a face-swap method illustrated in FIG. 3, the face alignment processing is performed on the target face image to obtain the target frame, the first face image in each of the M frames is replaced with the target frame to obtain the first output frame, thus improving the image effect after the face-swap, and improving interestingness.

It should be noted that, the face features of the target face image are not eliminated in the target frame, that is, the target frame incorporates the face features of the first face image and the face features of the target face image.

Alternatively, by the target frame is modified with a loss function. The loss function is a network model obtained via a neural-network-like training, configured to modify image loss after the face-swap, thus improving the image effect.

At block 102, feature point locating is performed on the first face image in a first frame in the M frames to obtain a first feature point set.

Figure 4:
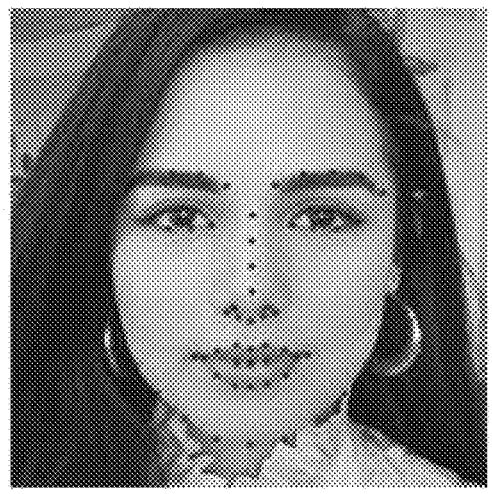
FIG. 4 is a schematic diagram illustrating face feature point locating according to embodiments of the present disclosure.

In this embodiment, the first frame is any one of the M frames. The number of the first feature point set may be 68. An objective of the face feature point locating is to further determine positions of facial features (such as eyes, eyebrows, the nose, the mouth, the outer contour of the face) based on the face recognition. A basic idea of a locating algorithm is combining face textual features and location constraints among individual feature points. As illustrated in FIG. 4, the points in FIG. 4 represent locations of feature points of the face image, in which each feature point corresponds to one feature value.

At block 103, a target feature point set corresponding to a target region is extracted from the first feature point set.

Figure 5:
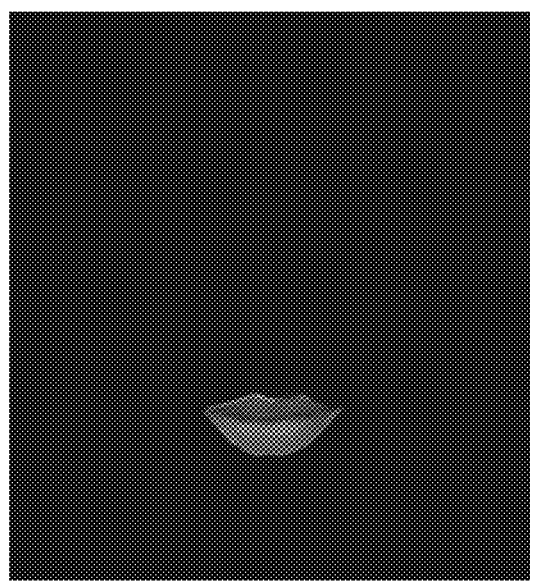
FIG. 5 is a schematic diagram illustrating extracting an image according to a target feature set according to embodiments of the present disclosure.

In this embodiment, the target feature point set is one feature set in the first face image, which may be the feature set determined according to the input video by the user. As illustrated in FIG. 5, the target feature point set is the mouth, and a face region image corresponding to the mouth is extracted.

At block 104, image synthesis is performed according to the target feature point set and the M first output frames to obtain M second output frames.

In this embodiment, for each of the M frames except the first frame, the image synthesis is performed on a corresponding target feature point set and the first output frame to obtain a new output frame, i.e. the second output frame, thus improving interestingness of the output video after the face-swap, and the face-swap processing is not necessary to be performed according to face features of each frame, improving convenience of operations.

Alternatively, a face region image corresponding to the target feature point set is obtained, and the image synthesis is performed on the face region image and each first output frame to obtain the corresponding second output frame. That is, the face region image is obtained according to the target feature point set of each frame firstly, and then the face region image is synthesized with the first frame after the face-swap to obtain M frames after face-swap.

In the method for processing a video illustrated in FIG. 1, the target recognition is performed on each frame in the input video to obtain the M frames containing the first face image, and the feature point locating is only performed on the frames containing the first face image to obtain the first feature point set, thus improving extracting efficiency. By performing the face-swap between any frame containing the first face image and the target face image to obtain the first output frame, and performing the image synthesis on each of the extracted target feature point set and the first output frame, interestingness of the output video is improved, and the face-swap is not necessary to be performed according to face features of each frame, thus improving convenience of operations.

Figure 6:
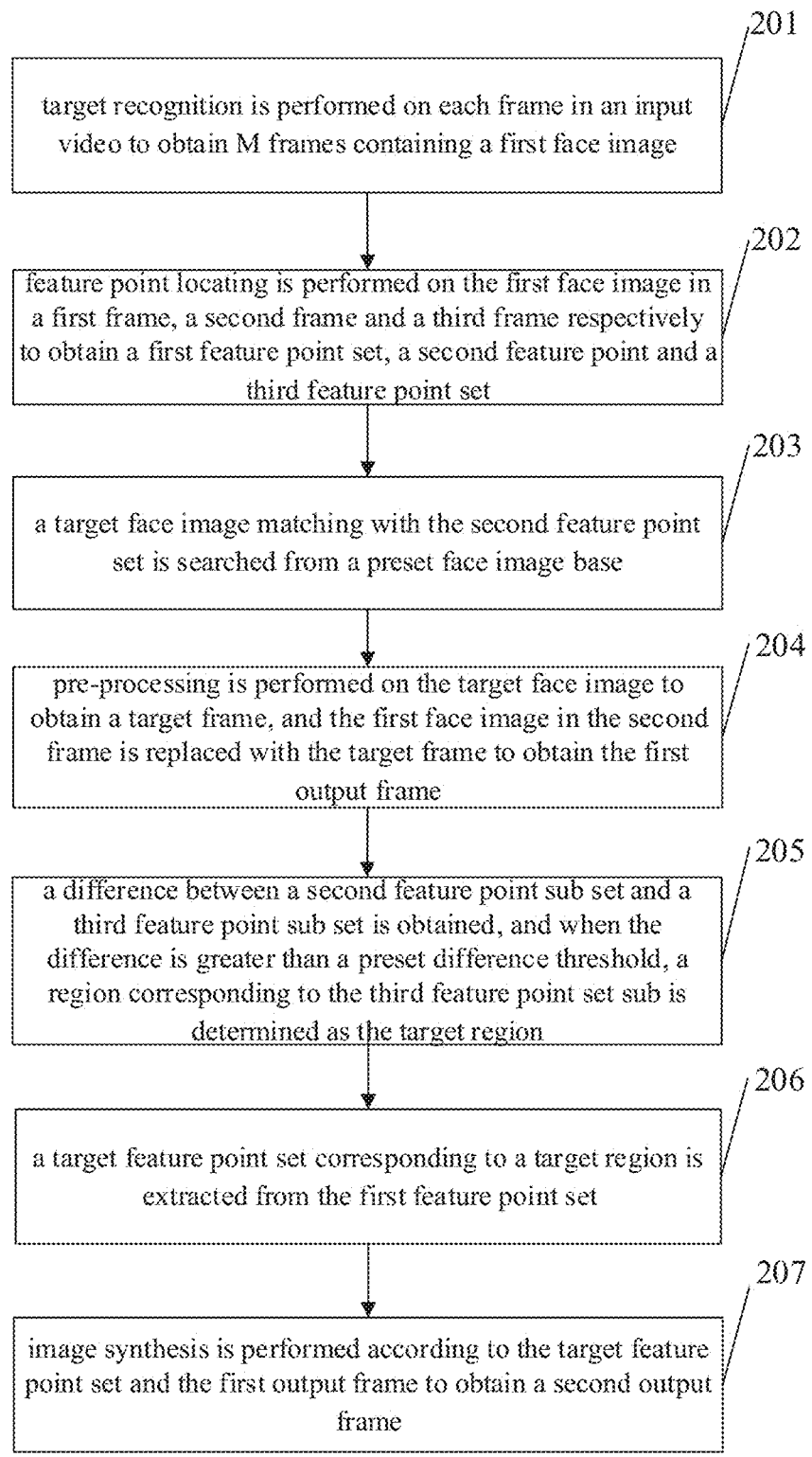
FIG. 6 is a follow chart of another method for processing a video according to embodiments of the present disclosure.

FIG. 6 is a flow chart of a method for processing a video according to embodiments of the present disclosure. Referring to FIG. 6, the method for processing a video may include following acts.

At block 201, target recognition is performed on each frame in an input video to obtain M frames containing a first face image.

At block 202, feature point locating is performed on the first face image in a first frame, a second frame and a third frame respectively to obtain a first feature point set, a second feature point and a third feature point set.

In this embodiment, a method for performing the feature point locating on the first face image in the first frame, the second frame and the third frame respectively is same as that for performing the feature point locating on the first face image in the first frame, which is not elaborated herein.

At block 203, a target face image matching with the second feature point set is searched from a preset face image base.

In this embodiment, the preset face image base includes a plurality of types of face images, and at least one target face image may be selected from the preset face image base according to the second feature point set. When a plurality of target face images are determined, an instruction for designating an image for face-swap may be received, such that a target face image to be finally converted is determined, or the plurality of target face images may be all converted and then provided to the user for selecting.

Alternatively, an image generation network is trained with input images via neural-network-like training, and the image generation network outputs the target face image according to the second feature point set and the preset face image base.

At block 204, pre-processing is performed on the target face image to obtain a target frame, and the first face image in the second frame is replaced with the target frame to obtain the first output frame.

The pre-processing may be face alignment processing, image enhancement processing and normalization processing, and the like. By performing the face alignment processing on the second face image, a face image with a regular face position may be obtained. By performing inverse alignment processing on a converted second face image, a face image with a face position coincident with that of the second face image in an image corresponding to the target face image, thus enhancing image effect. Image enhancement is to improve face image quality, that is, not only to make the image more clarity visually, but also to make the image easier for a computer to process and identify. A target of the normalization processing is to obtain normalized face images with a same size and a same range of gray value, thus further improving the image effect.

When the pre-processing is the face alignment processing, in order to ensure that face direction in the output image is coincident with that in the target face image, inverse face alignment processing may be performed on a fourth face image.

The loss function is a network model obtained via a neural-network-like training, configured to modify image loss after the face-swap, thus improving the image effect.

It should be noted that, the face features of the second face image are not eliminated in the replaced target frame, that is, the target frame incorporates the face features of the first face image and the face features of the target face image.

At block 205, a difference between a second feature point sub set and a third feature point sub set is obtained, and when the difference is greater than a preset difference threshold, a region corresponding to the third feature point set sub is determined as the target region.

In this embodiment, the third frame is a frame before the first frame in the M frames. Since the first face image in the input video cannot stay the same. That is, the user may speak or has expression changes. In order to make the finally synthesized video has the same effect, the difference between feature sets of adjacent frames is obtained, and when the difference between feature sets of adjacent frames is greater than the preset difference threshold, the feature set is determined as the target feature set of the frame.

For example, if a difference between mouth feature sets of the first frame and the third frame is greater than the preset difference threshold, the mouth feature set is determined as the target feature set of the second frame.

At block 206, a target feature point set corresponding to a target region is extracted from the first feature point set.

At block 207, image synthesis is performed according to the target feature point set and the first output frame to obtain a second output frame.

Detail description of acts 206-207 may refer to related acts in the method for processing a video illustrated in FIG. 1.

In the method for processing a video illustrated in FIG. 6, the target recognition is performed on each frame in the input video to obtain the M frames containing the first face image respectively, the feature point locating is only performed on the frames containing the first face image to obtain the first feature point set, thus improving extracting efficiency. Any frame containing the first face image is selected as the second frame, the target face image matching with the first face image is searched from the preset face image base according to the second feature point set, and the first face image in the second frame is replaced with the target frame, thus improving image effect after the face-swap. The target feature set is determined according to the difference between feature sets of the third frame and the first frame, ensuring consistency between the input video before the face-swap and the input video after the face-swap. The image synthesis is performed on a target feature set of each frame and the first output frame, such that the output video synthesized with time nodes of the output frames has a dynamic effect of five-feature, improving interestingness of the output video, and the face-swap is not necessary to be performed according to the face features of each frame, thus improving the convenience of operations.

Figure 7:
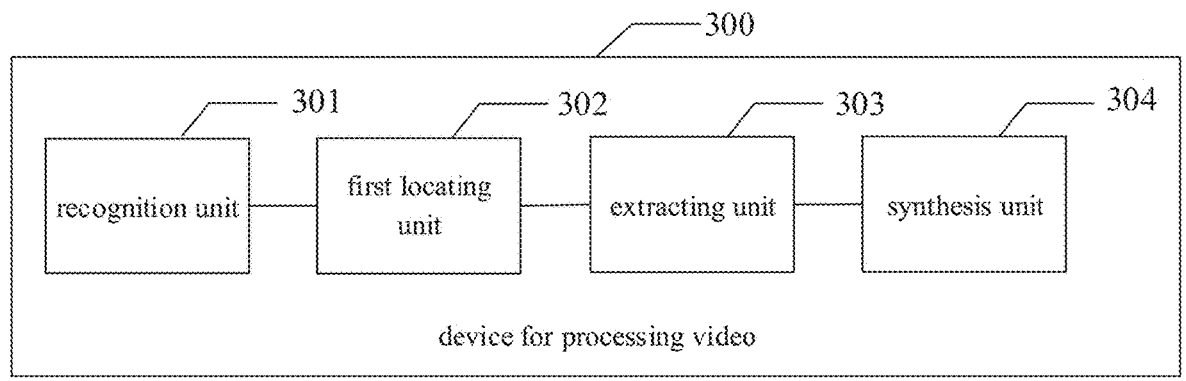
FIG. 7 is a block diagram illustrating a device for processing a video according to embodiments of the present disclosure.

FIG. 7 is a block diagram illustrating a device for processing a video according to embodiments of the present disclosure. Referring to FIG. 7, the device 300 for processing a video may include a recognition unit 301, a first locating unit 302, an extracting unit 303, and a synthesis unit 304.

The recognition unit 301 is configured to perform target recognition on each frame in an input video to obtain M frames containing a first face image and to replace the first face image in the M frames with a target face image to obtain M first output frames, in which M is an integer greater than 1.

The first locating unit 302 is configured to perform feature point locating on the first face image in a first frame in the M frames to obtain a first feature point set.

The extracting unit 303 is configured to extract a target feature point set corresponding to a target region from the first feature point set.

The synthesis unit 304 is configured to perform image synthesis according to the target feature point set and the M first output frames to obtain M second output frames.

In the device for processing a video illustrated in FIG. 7, the target recognition is performed on each frame in the input video to obtain the M frames containing the first face image, and the feature point locating is only performed on the frames containing the first face image to obtain the first feature point set, thus improving extracting efficiency. By performing the face-swap between any frame containing the first face image and the target face image to obtain the first output frame, and performing the image synthesis on each of the extracted target feature point set and the first output frame, interestingness of the output video is improved, and the face-swap is not necessary to be performed according to face features of each frame, thus improving convenience of operations.

Figure 8:
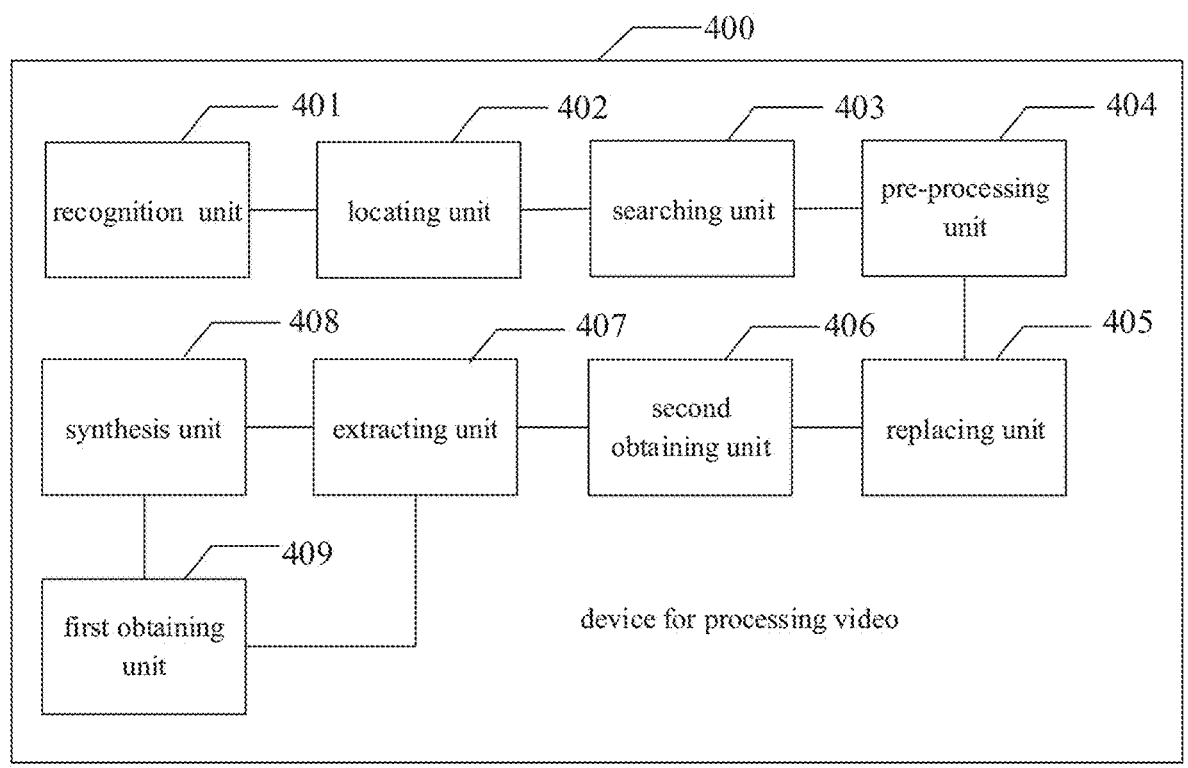
FIG. 8 is a block diagram illustrating another device for processing a video according to embodiments of the present disclosure.

FIG. 8 is a block diagram illustrating another device for processing a video according to embodiments of the present disclosure. Referring to FIG. 8, the device 400 for processing a video may include a recognition unit 401, a locating unit 402, a searching unit 403, a pre-processing unit 404, a replacing unit 405, a second obtaining unit 406, an extracting unit 407, and a synthesis unit 408.

The recognition unit 301 is configured to perform target recognition on each frame in an input video to obtain M frames containing a first face image, in which M is an integer greater than 1.

The locating unit 402 is configured to perform feature point locating on the first face image in a first frame, a second frame and a third frame respectively to obtain a first feature point set, a second feature point and a third feature point set.

The searching unit 403 is configured to search a target face image matching with the second feature point set from a preset face image base.

The pre-processing unit 404 is configured to perform pre-processing on the target face image to obtain a target frame. The pre-processing at least includes face alignment processing, face image enhancement processing and normalization processing.

The replacing unit 405 is configured to replace the first face image with the target frame to obtain the first output frame.

The second obtaining unit 406 is configured to obtain a difference between a second feature point subset and a third feature point subset. The second feature point subset corresponds to a reference region of the second feature point set, and the third feature point subset corresponds to a reference region of the third feature point set. The second obtaining unit 406 is configured to determine the region corresponding to the third feature point subset as the target region when the difference is greater than a preset difference threshold.

The extracting unit 407 is configured to extract a target feature point set corresponding to a target region from the first feature point set.

The synthesis unit 408 is configured to perform image synthesis according to the target feature point set and the first output frame to obtain a second output frame.

Alternatively, the device may include a first obtaining unit 409.

The first obtaining unit 409 is configured to obtain a face region image corresponding to the target feature point set. The synthesis unit 408 is configured to perform image synthesis on the face region image and the first output frame to obtain the second output frame.

In the device for processing a video illustrated in FIG. 8, the target recognition is performed on each frame in the input video to obtain the M frames containing the first face image respectively, the feature point locating is only performed on the frames containing the first face image to obtain the first feature point set, thus improving extracting efficiency. Any frame containing the first face image is selected as the second frame, the target face image matching with the first face image is searched from the preset face image base according to the second feature point set, and the first face image in the second frame is replaced with the target frame, thus improving image effect after the face-swap. The target feature set is determined according to the difference between feature sets of the third frame and the first frame, ensuring consistency between the input video before the face-swap and the input video after the face-swap. The image synthesis is performed on a target feature set of each frame and the first output frame, such that the output video synthesized with time nodes of the output frames has a dynamic effect of five-feature, improving interestingness of the output video, and the face-swap is not necessary to be performed according to the face features of each frame, thus improving the convenience of operations.

Figure 9:
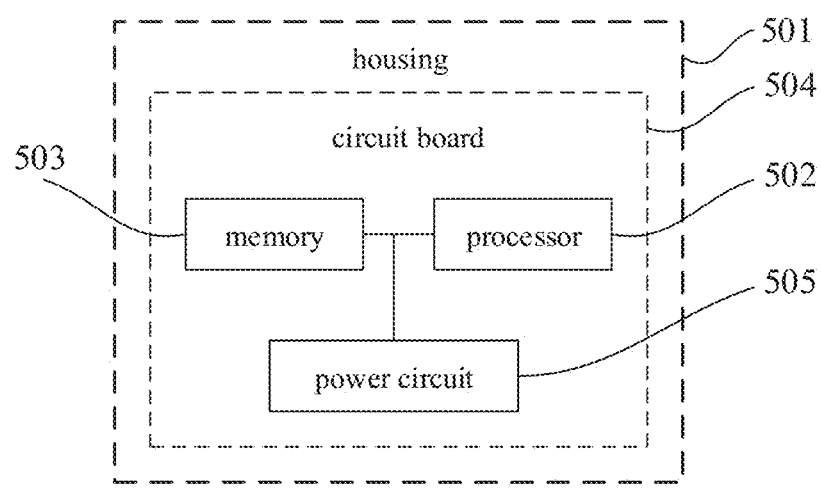
FIG. 9 is a block diagram illustrating an electronic device according to embodiments of the present disclosure.

FIG. 9 is a block diagram illustrating an electronic device disclosed in embodiments of the present disclosure. Referring to FIG. 9, the electronic device may be a mobile phone, a tablet computer, and the like. As illustrated in FIG. 9, the electronic device may include a housing 501, a processor 502, a memory 503, a circuit board 504 and a power circuit 505. The circuit board 504 is arranged inside a space enclosed by the housing 501, the processor 502 and the memory 503 are disposed on the circuit board 504. The power circuit 505 is configured to provide power for individual circuits or components of the electronic device. The memory 503 is configured to store executable program codes. The processor 502, by reading the executable program codes stored in the memory 503, is configured to run programs corresponding to the executable program codes, so as to perform following acts.

Target recognition is performed on each frame in an input video to obtain M frames containing a first face image. M is an integer greater than 1.

The first face image in the M frames is replaced with a target face image to obtain M first output frames.

Feature point locating is performed on the first face image in a first frame in the M frames to obtain a first feature point set.

A target feature point set corresponding to a target region is extracted from the first feature point set.

Image synthesis is performed according to the target feature point set and the M first output frames to obtain M second output frames.

As a possible implementation performing the image synthesis according to the target feature point set and the M first output frames to obtain the M second output frames, includes: obtaining a face region image corresponding to the target feature point set; and performing the image synthesis on the face region image and each first output frame to obtain the corresponding second output frame.

As a possible implementation, before performing the image synthesis according to the target feature point set and the M first output frames, following acts are further performed.

Feature point locating is performed on the first face image in a second frame in the M frames to obtain a second feature point set.

The target face image matching with the second feature point set is searched from a preset face image base.

As a possible implementation, replacing the first face image in the M frames to obtain the M first input frames includes:

performing pre-processing on the target face image to obtain a target frame, wherein the pre-processing at least comprises face alignment processing, face image enhancement processing and normalization processing; and replacing the first face image in the M frames with the target frame to obtain the M first output frames.

As a possible implementation, before extracting the target feature point set corresponding to the target region from the first feature point set, following acts are further performed.

Feature point locating is performed on the first face image in a third frame before the first frame in the M frames to obtain a third feature point set.

A difference between a second feature point subset and a third feature point subset is obtained, the second feature point subset corresponds to a reference region of the second feature point set, and the third feature point subset corresponds to the reference region of the third feature point set.

When the difference is greater than a preset difference threshold, it is determined the region corresponding to the third feature point subset as the target region.

In the electronic device illustrated in FIG. 9, the target recognition is performed on each frame in the input video to obtain the M frames containing the first face image, and the feature point locating is only performed on the frames containing the first face image to obtain the first feature point set, thus improving extracting efficiency. By performing the face-swap between any frame containing the first face image and the target face image to obtain the first output frame, and performing the image synthesis on each of the extracted target feature point set and the first output frame, interestingness of the output video is improved, and the face-swap is not necessary to be performed according to face features of each frame, thus improving convenience of operations.

A non-transitory computer-readable storage medium is provided in an embodiment, having stored therein instructions that, when a processor executes the instructions, cause the processor to perform the method for processing a video provided in the first embodiment or the second embodiment.

An application is provided in an embodiment, when executed, configured to perform the method for processing a video provided in the first embodiment or the second embodiment.

It should be understood that, the system, the device and the method disclosed in the embodiments provided in present disclosure may be implemented via other ways. For example, the above-described device embodiments are only exemplary. For example, the division of modules or units is only a logical function division, and there are other dividing ways in actual implementations. For example, a plurality of units or components may be combined or be integrated in another system, or some features may be ignored or be not executed. In addition, the shown or discussed mutual coupling or direct coupling or communication connection may be indirect coupling or communication connection through some interfaces, devices or units, and may be electrical, mechanical or other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in the form of hardware or in the form of software.

The integrated unit, if implemented in the form of a software functional unit and sold or used as an independent product, may be stored in a computer-readable storage medium. Based on such understanding, the technical solutions of the present application essentially, or the part contributing to the prior art, or all or part of the technical solutions may be embodied in the form of a software product. The computer software product is stored in a storage medium, including several instructions for causing a computer device (which may be a personal computer, a server, or a network device, etc.) or a processor to execute all or part of steps of the methods in the embodiments of the present disclosure. The foregoing storage medium includes various media that can store program codes, such as a USB flash drive, a mobile hard disk drive, a read only memory (ROM), a random access memory (RAM), a magnetic disk, an optical disk, etc.

The foregoing is merely the specific implementation manners of the present disclosure. However, the protection scope of the present disclosure is not limited thereto. Anyone skilled in the art may easily conceive, within the technical scope disclosed in the present disclosure, changes and substitutions that should be covered within the scope of protection of the application. Therefore, the protection scope of the present disclosure shall be subject to the protection scope of the claims.

What is claimed is:

1. A method for processing a video, comprising:
performing target recognition on each frame in an input video to obtain M frames containing a first face image, the M frames being obtained in time order, wherein M is an integer greater than 1;
replacing the first face image in the M frames with a target face image to obtain M first output frames;
performing feature point locating on the first face image in a first frame in the M frames to obtain a first feature point set;
performing feature point locating on the first face image in a third frame before the first frame in the M frames to obtain a third feature point set;
obtaining a positional difference between feature points of a first feature point subset and a third feature point subset, wherein the first feature point subset corresponds to a reference region of the first feature point set, and the third feature point subset corresponds to the reference region of the third feature point set;
when the difference is greater than a preset difference threshold, determining the region corresponding to the third feature point subset as a target region;
extracting a target feature point set corresponding to the target region from the first feature point set; and
performing image synthesis according to the target feature point set and the M first output frames to obtain M second output frames.

2. The method according to claim 1, wherein performing the image synthesis according to the target feature point set and the M first output frames to obtain the M second output frames, comprises:
obtaining a face region image corresponding to the target feature point set; and
performing the image synthesis on the face region image and each first output frame to obtain the corresponding second output frame.

3. The method according to claim 2, before performing the image synthesis according to the target feature point set and the M first output frames, further comprising:
performing feature point locating on the first face image in a second frame in the M frames to obtain a second feature point set; and
searching the target face image matching with the second feature point set from a preset face image base.

4. The method according to claim 1, before performing the image synthesis according to the target feature point set and the M first output frames, further comprising:
performing feature point locating on the first face image in a second frame in the M frames to obtain a second feature point set; and
searching the target face image matching with the second feature point set from a preset face image base.

5. The method according to claim 1, wherein replacing the first face image in the M frames to obtain the M first input frames comprises:
performing pre-processing on the target face image to obtain a target frame, wherein the pre-processing at least comprises face alignment processing, face image enhancement processing and normalization processing; and
replacing the first face image in the M frames with the target frame to obtain the M first output frames.

6. An electronic device, comprising: a housing, a processor, a memory, a circuit board and a power circuit, wherein, the circuit board is arranged inside a space enclosed by the housing, the processor and the memory are disposed on the circuit board; the power circuit is configured to provide power for individual circuits or components of the electronic device; the memory is configured to store executable program codes; and the processor, by reading the executable program codes stored in the memory, is configured to run programs corresponding to the executable program codes, so as to perform acts of:
performing target recognition on each frame in an input video to obtain M frames containing a first face image, the M frames being obtained in time order, wherein M is an integer greater than 1;
replacing the first face image in the M frames with a target face image to obtain M first output frames;
performing feature point locating on the first face image in a first frame in the M frames to obtain a first feature point set;
performing feature point locating on the first face image in a third frame before the first frame in the M frames to obtain a third feature point set obtaining a positional difference between feature points of a first feature point subset and a third feature point subset, wherein the first feature point subset corresponds to a reference region of the first feature point set, and the third feature point subset corresponds to the reference region of the third feature point set;
when the difference is greater than a preset difference threshold, determining the region corresponding to the third feature point subset as a target region;
extracting a target feature point set corresponding to the target region from the first feature point set; and
performing image synthesis according to the target feature point set and the M first output frames to obtain M second output frames.

7. The electronic device according to claim 6, wherein the processor is configured to perform the image synthesis according to the target feature point set and the M first output frames to obtain the M second output frames, by acts of:
obtaining a face region image corresponding to the target feature point set; and
performing the image synthesis on the face region image and each first output frame to obtain the corresponding second output frame.

8. The electronic device according to claim 7, wherein the processor is configured to perform acts of:
before performing the image synthesis according to the target feature point set and the M first output frames, performing feature point locating on the first face image in a second frame in the M frames to obtain a second feature point set; and
searching the target face image matching with the second feature point set from a preset face image base.

9. The electronic device according to claim 6, wherein the processor is configured to perform acts of:

before performing the image synthesis according to the target feature point set and the M first output frames, performing feature point locating on the first face image in a second frame in the M frames to obtain a second feature point set; and searching the target face image matching with the second feature point set from a preset face image base.

10. The electronic device according to claim 6, wherein the processor is configured to replace the first face image in the M frames to obtain the M first input frames by acts of:

performing pre-processing on the target face image to obtain a target frame, wherein the pre-processing at least comprises face alignment processing, face image enhancement processing and normalization processing; and replacing the first face image in the M frames with the target frame to obtain the M first output frames.

11. A non-transitory computer-readable storage medium, having stored therein instructions that, when a processor executes the instructions, cause the processor to perform a method for processing a video, the method comprising:

performing target recognition on each frame in an input video to obtain M frames containing a first face image, the M frames being obtained in time order, wherein M is an integer greater than 1;

replacing the first face image in the M frames with a target face image to obtain M first output frames;

performing feature point locating on the first face image in a first frame in the M frames to obtain a first feature point set;

performing feature point locating on the first face image in a third frame before the first frame in the M frames to obtain a third feature point set;

obtaining a positional difference between feature points of a first feature point subset and a third feature point subset, wherein the first feature point subset corresponds to a reference region of the first feature point set, and the third feature point subset corresponds to the reference region of the third feature point set;

when the difference is greater than a preset difference threshold, determining the region corresponding to the third feature point subset as a target region;

extracting a target feature point set corresponding to the target region from the first feature point set; and performing image synthesis according to the target feature point set and the M first output frames to obtain M second output frames.

12. The non-transitory computer-readable storage medium according to claim 11, wherein performing the image synthesis according to the target feature point set and the M first output frames to obtain the M second output frames, comprises:

obtaining a face region image corresponding to the target feature point set; and performing the image synthesis on the face region image and each first output frame to obtain the corresponding second output frame.

13. The non-transitory computer-readable storage medium according to claim 11, wherein the method further comprises:

before performing the image synthesis according to the target feature point set and the M first output frames, performing feature point locating on the first face image in a second frame in the M frames to obtain a second feature point set; and searching the target face image matching with the second feature point set from a preset face image base.

14. The non-transitory computer-readable storage medium according to claim 11, wherein replacing the first face image in the M frames to obtain the M first input frames comprises:

performing pre-processing on the target face image to obtain a target frame, wherein the pre-processing at least comprises face alignment processing, face image enhancement processing and normalization processing; and replacing the first face image in the M frames with the target frame to obtain the M first output frames.

* * * * *